United States Patent
Roberts

(10) Patent No.: US 8,308,851 B2
(45) Date of Patent: *Nov. 13, 2012

(54) REMOVAL OF CONTAMINANTS FROM WATER AND GAS BY FILTRATION

(76) Inventor: David Roberts, Lewisport (CA)

(*) Notice: Subject to any disclaimer, the term of this patent is extended or adjusted under 35 U.S.C. 154(b) by 303 days.

This patent is subject to a terminal disclaimer.

(21) Appl. No.: 12/646,413

(22) Filed: Dec. 23, 2009

(65) Prior Publication Data

US 2010/0096342 A1 Apr. 22, 2010

Related U.S. Application Data

(63) Continuation-in-part of application No. 12/568,425, filed on Sep. 28, 2009, now abandoned, which is a continuation of application No. 11/691,742, filed on Mar. 27, 2007, now Pat. No. 7,597,809.

(51) Int. Cl.
*B01D 46/00* (2006.01)

(52) U.S. Cl. .......................................................... 95/285

(58) Field of Classification Search ....................... 95/285
See application file for complete search history.

(56) References Cited

U.S. PATENT DOCUMENTS

| 2,380,456 | A | * | 7/1945 | Maier et al. | .................. | 524/274 |
| 4,844,721 | A | | 7/1989 | Cox et al. | | |
| 7,597,809 | B1 | * | 10/2009 | Roberts | ........................ | 210/693 |
| 2003/0217640 | A1 | * | 11/2003 | Alper | ................. | 95/90 |
| 2007/0175192 | A1 | * | 8/2007 | Niakan et al. | .................. | 55/486 |
| 2010/0268107 | A1 | * | 10/2010 | de Heer | ....................... | 600/539 |

FOREIGN PATENT DOCUMENTS

GB 736265 A 9/1955

OTHER PUBLICATIONS

International Search Report and Written Opinion issued on Feb. 17, 2011 for PCT/CA2010/001995 filed on Dec. 21, 2010, 9 pages.

* cited by examiner

*Primary Examiner* — Chester Barry
(74) *Attorney, Agent, or Firm* — Thompson Coburn LLP; Charles P. Romano

(57) ABSTRACT

The invention relates to compositions and methods for separating oil and other contaminants (particularly oleophilic compounds) from water, gas and other carriers. The invention is useful for separating oil, including emulsified oil, from water and other oleophilic compounds from bilgewater and other wastewater. The compositions comprise a hydrocarbon resin and a drying oil, which may be combined in an organic solvent. For example, hydrocarbon resin and tung oil are optionally combined into a naphtha solvent. The invention is also useful for removing a variety of contaminants from an air stream, such as exhaust from internal combustion engines, burners, and other sources.

19 Claims, No Drawings

REMOVAL OF CONTAMINANTS FROM WATER AND GAS BY FILTRATION

CROSS-REFERENCE TO RELATED APPLICATIONS

This application is a continuation-in-part of U.S. application Ser. No. 12/568,425 filed on Sep. 28, 2009, which is a continuation of U.S. application Ser. No. 11/691,742, filed on Mar. 27, 2007, now issued to U.S. Pat. No. 7,597,809.

FIELD OF THE INVENTION

The invention relates to compositions and methods for separating oil and other contaminants from water, such as bilgewater and other wastewater, and for removing contaminants from a gaseous medium such as exhaust from an internal combustion engine, burner, or other stationary or mobile source.

BACKGROUND OF THE INVENTION

Oil pollution is a serious environmental concern in shipping, the oil production industry and on industrial lands using heavy machinery or oil storage that contaminates groundwater. Many chemical and mechanical strategies have been utilized to remediate oil contamination, such as booms, skimmers, pumps, dispersants, absorbents and phytoremediation. Each of these techniques has limitations, such as cost or inability to remove all types of oil. For example, none of these techniques has been satisfactory in dealing with emulsified oil in water. Oil is often spilled into soil and ground water from ruptured storage tanks. The most commonly spilled oil is crude oil, which is sometimes spilled accidentally, for example, after a ship collision, but more commonly enters the environment when ships empty bilge tanks. The behaviour of oil in water depends on the type of oil as well as conditions such as water and air temperature, wave motion and wind. Spilled oil will typically spread out, the lighter, more volatile components of oil will evaporate and wave movements will mix water into the oil creating a heavy and sticky emulsion (typically a water in oil emulsion). This type of emulsion, called a mechanical emulsion, is difficult to remove from water.

There is also a particular need for compositions that separate chemical emulsions from water. These emulsions form in oily water when surfactants, such as detergents, are present along with the oil. For example, detergents used to clean ships often wind up in wastewater in bilge tanks along with crude oil. Detergents have an oleophilic hydrocarbon chain and a hydrophilic head. When detergent contacts oil, the oleophilic portion of the surfactant adheres to the oil and the hydrophilic portion remains attracted to water. Therefore, chemical process associated with creation of such emulsions result in the oil molecules becoming partially or wholly surrounded by surfactant molecules, preventing the oil molecules from contacting other oil droplets or coalescing surfaces to allow them to coalesce. For this reason, chemically emulsified oil is very difficult to remove from water.

Existing oil separation technologies which utilize passive treatment processes are ineffective at separating chemically emulsified oils, those formed by the interaction of oily water with surfactants. At present the only practical ways of removing such emulsions in industry involve active treatment measures such as addition of de-emulsifying chemicals to break the chemical emulsions. Another approach involves addition of chemicals to attach to the surface of the surfactant/oil particles so as to change their density relative to the carrier fluid, so they can be separated more easily by gravity. Membrane filtration systems are also used such as systems in which the pore spaces of the membrane are so small that it can filter out surfactant/oil molecules from the water. There are also various forms of coagulation/filtration processes which use chemicals to agglomerate the surfactant/oil molecules so they can be separated more easily by gravity separation. All of these processes involve significant capital, operational and maintenance costs, as well as handling and disposal issues for the chemicals being used. This has led industry to search for easier and more efficient passive solutions for separating chemically emulsified oils from water. There remains a need for simple, inexpensive absorbent which can capture any type of oil and other oleophilic compounds, including oils that are very difficult to separate from water, such as mechanically or chemically emulsified oil. As well, there is a need for a simple and effective oil separator which can be installed next to industrial equipment, such as on a ship so that that oil can be collected and properly disposed of so that it does not enter waste water, such as bilgewater.

Air pollution is a serious environmental concern in everyday life. Air pollution is a global problem, not just isolated to specific areas of our planet. There are many contaminants that contribute to air pollution from many small scale combustion engines, as well as larger industrial sources.

Many chemical and mechanical systems have been utilized to remediate air contamination, such as catalytic converters, scrubbers, dispersants, and absorbents. Each of these techniques has limitations, such as high cost or inability to remove all types of contaminants. At present the most practical ways of removing such noxious gases in industry involve treatment measures such as low micron filters, chemicals, for catalyst, scrubbers to remove the noxious gases and particulate matter. Membrane filtration systems are also used such as systems in which the pore spaces of the membrane are so small that it can filter out noxious gas molecules from the air. There are also various forms of coagulation/filtration processes which use chemicals to agglomerate the noxious gas molecules so they can be separated more easily. All of these processes involve significant capital, operational and maintenance costs, as well as handling and disposal issues for the chemicals being used and/or generated. This has led industry to search for easier and more efficient passive solutions for removing noxious gases/particulate matter from air.

There remains a need for simple, inexpensive absorbent/converter which can capture a variety of noxious gases and particulate matter compounds. There is also a need for a simple and effective way to remove these pollutants from a waste stream which can be installed at the exhaust outlet of a variety of types of industrial equipment, engines, stacks, chimneys, etc., where pollutants can be collected or converted and properly disposed of.

SUMMARY OF THE INVENTION

The invention relates to compositions and methods for separating oil and other contaminants (particularly oleophilic compounds) from water and other carriers. The invention is particularly useful for separating oil and other oleophilic compounds from bilgewater and other wastewater. The compositions typically comprise a hydrocarbon resin and a drying oil. The compounds in the composition are typically combined in an organic solvent. For example, hydrocarbon resin and tung oil are optionally combined into a naphtha solvent. The invention is particularly useful for separating emulsified oil from water, whether oil in water emulsions or water in oil emulsions. The compositions separate both mechanical emulsions and chemical emulsions from water. The compositions are particularly useful to remove mechanically emulsified or chemically emulsified hydrocarbon compounds from water and then release them in a coalesced form as free-floating oil. Another aspect of the invention relates to media impregnated with compositions of the invention. In an embodiment, the invention relates to a filter or separator comprising the aforementioned media. The invention also includes an apparatus for separating oil and other contaminants. The invention also includes the use of the compositions of the invention for preparation of media, a filter or a separator for separating oil and other contaminants, such as oleophilic compounds, from a carrier. The invention also includes the use of the compositions, media, filter, separator and apparatus of the invention for separating oil and other contaminants, such as oleophilic compounds from a carrier, typically water.

The invention relates to a composition comprising a hydrocarbon resin and a drying oil. The hydrocarbon resin optionally comprises an aliphatic hydrocarbon resin. The hydrocarbon resin optionally comprises a petroleum hydrocarbon resin. The drying oil comprises tung oil, linseed oil, poppy oil, walnut oil, sunflower oil, cottonseed oil, corn oil, soybean oil, sardine oil, herring oil or safflower oil.

The composition may be prepared by dissolving the hydrocarbon residue and drying oil in a solvent, such as an organic solvent, capable of dissolving the hydrocarbon resin and the drying oil. In one example, the hydrocarbon resin comprises an aliphatic hydrocarbon resin, the drying oil comprises tung oil and the organic solvent comprises naphtha. The dissolved composition may then be used to impregnate a filter substrate, with the solvent then being removed, for example by evaporation.

In one embodiment, the volume of hydrocarbon resin in the composition is less than the volume of tung oil in the composition. The hydrocarbon resin and tung oil are optionally combined in a volume ratio of about 1:2. The hydrocarbon resin, tung oil and naphtha are optionally combined in a volume ratio of about 1:2:20. The composition optionally further comprises at least one compound selected from the group consisting of teak oil, petroleum resin and rosin.

Another aspect of the invention relates to media impregnated with a composition of the invention. Another aspect of the invention relates to a filter or separator comprising media impregnated with a composition of the invention, such as a hydrocarbon resin, a drying oil and a solvent. The media optionally comprises fluid-permeable media. The media optionally comprises perlite or polypropylene.

Another aspect of the invention relates to a method of separating oil or other compounds (e.g. an oleophilic compound, phenols, grease, ammonia, sulphides, heavy metals, polychlorinated biphenyls and methyl tertiary butyl ether), from a carrier comprising: contacting the oil and carrier with a composition of the invention, the media of the invention, or the filter or separator of an the invention; separating the carrier from the composition, media, filter or separator, wherein the oil is retained on the media.

The carrier is optionally separated from the filter or separator by flowing the carrier under pressure through the composition, media, filter or separator. The water pressure is 100 psi or less. The carrier optionally comprises water and the oil separated from the carrier comprises emulsified oil. The emulsified oil optionally comprises a mechanical emulsion or a chemical emulsion.

Another aspect of the invention relates to a method of separating emulsified oil (or other emulsified oleophilic compounds) from a carrier such as water, comprising: contacting the emulsified oil and water with media of the invention, or the filter or separator comprising the media; separating the water from the media, filter or separator, wherein the emulsified oil is retained on the media, filter or separator; contacting additional oil and water with the media, filter or separator until the media, filter or separator becomes saturated with oil and releases free floating oil into the water; collecting the free floating oil. The water typically flows through the media and the free floating oil is released into water downstream of the media, filter or separator. The free floating oil is optionally collected from the downstream water. The oil is collected by gravity oil water separation.

The invention further relates to use of compositions comprising a hydrocarbon resin and a drying oil for removing or converting noxious gases and particulate matter, heavy metals and other contaminants from air and other carriers. The invention further comprises a system or removing contaminants from a gaseous medium, or converting such contaminants into a less-contaminating substance. According to this aspect, the invention relates to a filter or separator comprising media impregnated with a composition according to the invention, such as a hydrocarbon resin, a drying oil and a solvent. The media optionally comprises fluid-permeable media. The media optionally comprises perlite or polypropylene.

An object of the composition is to remove or convert contaminants from gaseous emissions or from ambient air. Such source emissions may include small scale combustion sources or larger scale industrial sources. Common air pollutants typically comprise a combination of volatile organic compounds (VOC'S), particulates, nitrogen oxides, sulphur oxides, carbon monoxide, etc. Hydrocarbon fuels such as gas and diesel fuels contain numerous hydrogen and carbon atoms.

The composition comprising a hydrocarbon resin and a drying oil combined with an oxygen supply may be used to convert the hydrogen in the fuel to water and the carbon to carbon dioxide; nitrogen oxides are typically converted into harmless nitrogen gas.

Contaminated air or other gas typically flows through a media impregnated with a hydrocarbon resin and a drying oil, thereby stripping the contaminants from the gas or converting them into less harmful compounds. The contaminants are thus either collected by the media, and/or converted to water, carbon dioxide, and nitrogen gas which may be released into the environment.

Also provided herein are filters comprising a filter medium for removing a contaminant from a gas, where the filter medium comprises a substrate impregnated with a hydrocarbon resin and a drying oil. In certain embodiments, the filter media is prepared by combining a hydrocarbon resin and drying oil with an organic solvent to form a solution, contacting the substrate with the solution, and removing the organic solvent by evaporation. In certain embodiments, the substrate comprises perlite, steel wool or polyester fibres. In certain embodiments, the hydrocarbon residue comprises a low molecular weight hydrocarbon resin. In certain embodiments, the drying oil comprises tung oil, linseed oil, poppy oil, walnut oil, sunflower oil, cottonseed oil, corn oil, soybean oil, sardine oil, herring oil or safflower oil.

Other features, objects and advantages of the present invention will become apparent from the following detailed description. It should be understood, however, that the detailed description and the specific examples, while indicating preferred embodiments of the invention, are given by way of illustration only. Various changes and modifications within the spirit and scope of the invention will become apparent to those skilled in the art from this detailed description.

DETAILED DESCRIPTION OF THE INVENTION

The invention relates to compositions and methods for separating oil and other contaminants (particularly oleophilic compounds) from water and other carriers. It is particularly useful for separating oil and other oleophilic compounds from bilgewater and other wastewater. The invention advantageously separates emulsified oil from water, whether oil-in-water emulsions or water-in-oil emulsions.

Other aspects of the invention relate to media comprising compositions of the invention and a filter or separator comprising the aforementioned media. The invention also includes an apparatus for separating oil and other oleophilic compounds from water.

The invention optionally provides a composition comprising a hydrocarbon resin and a drying oil. The hydrocarbon resin is optionally a petroleum hydrocarbon resin. The hydrocarbon resin is optionally an aliphatic hydrocarbon resin, for example, a low molecular weight hydrocarbon resin having a low softening point. In one example, the hydrocarbon resin is optionally Nevtac 10 resin (Neville Chemical Company) which has a softening point about 10 degree C. (plus or minus 5 degree C.), specific gravity at 25 degree C. of about 0.95, molecular weight of about 225, negligible solubility in water and a viscosity of about 68,000 (one of skill in the art will recognize that other aliphatic hydrocarbon resins having similar properties, for example, having at least one of the aforementioned values increased or decreased by 10% or less or 5% or less will also be useful). Low molecular weight gives high tack and low solution viscosities. Aliphatic hydrocarbon resins also offer heat and color stability, resistance to ultraviolet light, acids and alkalis as well as compatibility with oils. The drying oil optionally comprises tung oil (optionally 100% pure tung oil) and may be any suitable oil, such as Tung Oil LV120 oil (L.V. Lomas; chinawood oil, CAS No. 8001-20-5) or Minwax Tung Oil Protective Finish tung oil (Minwax Company). Other examples of drying oils include linseed oil, poppy oil, walnut oil, sunflower oil, cottonseed oil, corn oil, soybean oil, sardine oil, herring oil and safflower oil. The hydrocarbon resin and the drying oil are typically dissolved in an organic solvent. The organic solvent substantially or completely evaporates during a subsequent curing process to form a cured composition. Naphtha, such as naphtha based fuel, is an example of a useful organic solvent. An example of a useful naphtha based fuel would be Imperial brand naphtha, which is an aliphatic hydrocarbon, light naphtha-hydrotreated, having CAS number 64742-49-0 and a density of about 0.68 kg/L at 15° C. Other volatile organic solvents (typically obtained from petroleum distillates) that are capable of dissolving hydrocarbon resin and drying oil, such as tung oil are also useful.

In one embodiment, hydrocarbon resin is mixed with tung oil and camp fuel (naphtha). The proportions and order of mixture of each of these ingredients is variable. The volume of tung oil combined in the composition is typically greater than the volume of hydrocarbon resin. In one example, hydrocarbon resin and tung oil are mixed in a ratio of approximately 1:2 respectively (33% by volume and 67% by volume). These compounds are optionally heated, for example to at least 50° C., 75° C. or 100° C. to obtain better mixing properties. The hydrocarbon resin/tung oil composition is then optionally mixed with naphtha in a ratio of about 1:7 respectively (12.5% by volume and 87.5% by volume) to form the impregnation composition (i.e. the hydrocarbon resin, tung oil and naphtha are combined in a volume ratio of about 1:2:20 respectively; 4.3% by volume, 8.7% by volume and 87% by volume). Other suitable organic solvents useful instead naphtha will be readily apparent. It will also be readily apparent that amounts of the hydrocarbon resin, drying oil and solvent are readily increased or decreased, for example, by increasing or decreasing volume of one or more compounds by 75% or less or 50% or less or 25% or less or 10% or less than the amounts in the above ratios. Colouring agent, such as paint pigment, is optionally added to colour the impregnation composition. The colour has the advantage of allowing one to determine that the composition has been fully absorbed by the media. The final composition is optionally referred to as an impregnation composition that may be impregnated in any suitable media, such as perlite or polypropylene, to form impregnated media. The impregnated media is then cured by drying, for example by air drying and/or oven drying (for example, one may use a drying time of 8 wks at room temperature, or a drying time of at least 30 minutes at 300° F.). Much of the naphtha evaporates during the curing process.

The compositions optionally include one or more of teak oil, rosin or petroleum resin, such as a aromatic hydrocarbon petroleum resin (e.g. Nevchem LR Resin; liquid hydrocarbon petroleum resin from the petroleum hydrocarbon family having a specific gravity of 1.016@30° C. and a boiling point of 325° C.).

The composition is useful in liquid form on oil spills (e.g. ocean or freshwater lake oil spills) and similar applications, to coalesce and coagulate the oil to prevent it from dispersing, and aid in the clean up (media impregnated with the compositions not necessary). The composition is also usefully applied to oil absorbent booms, mats and pads of various types for use in oil spill containment and recovery, including removal of sheens from water. The composition is also optionally used with existing coalescer plate for coalescing oil and other similar technologies to improve the oil removal ability of those technologies, for example, by applying the composition to the coalescer plates themselves. Coalescer plates are generally impermeable to water and oil. They generally rely on two factors to make them useful as coalescer plates (1) their surface is 'oleophilic' meaning they have a natural affinity for oil, a property that is shared by a number of naturally occurring materials, such as plastic, polyurethane etc (2) they are typically oriented in an upwardly angled position, sometimes with frequent changes in direction of the plates, to take advantage of physical processes of coalescing whereby the oil molecule is encouraged to float up near the surface of the material, or hit it due to flow direction changes, so that it will stick to the coalescing surface. In addition to coalescer plates, coalescing beads are optionally used. These beads work on the same principle of trying to get the oil molecules close enough to a naturally attractive surface to adhere to the surface. Coalescing materials are typically made of a material that originated from oil (like plastics etc) and are oleophilic.

The composition is also useful for removal of non-oil related compounds that are contaminants, such as heavy metals, PCB's, ammonia, sulphides, phenols etc. The methods of the invention described with respect to oil removal are readily adapted by contacting water or other carriers that contain one or more of these contaminants with the compositions of the invention.

The invention relates to compositions which are readily applied to practically any substrate material for removing oil and other contaminants from water and other aqueous phase liquids. The compositions are also useful in liquid form for coalescing oil products. In addition to hydrocarbons, the compositions have an affinity for other materials such as phenols, grease, ammonia, sulphides, heavy metals, PCB's (polychlorinated biphenyls), MTBE's (methyl tertiary butyl ether) and related compounds, and are useful in different types of equipment, such as filters or separators, to decrease the concentration of such products in the carrier.

The composition, when applied to a substrate material, appears to attract oil molecules and other contaminants to the surface of the substrate material. The compositions and attraction process work on free oil (also called free-floating oil, which refers to non-dissolved hydrocarbons often appearing as globules/drops), oil in water emulsions and water in oil emulsions. The process and compositions usefully treat mechanically emulsified oil and chemically emulsified oil, as well as other products noted above. In the case of oil molecules suspended in an aqueous solution, the oil is attracted to the surface of the media impregnated with the composition where the oil will coalesce into larger particles. This action of transforming emulsified oil molecules into larger particles results in most of the oil becoming free floating product, i.e. converted from oil emulsified in water to coalesced oil globules. Once the media has been saturated with oil, any additional product entering the media will cause previously coalesced oil to release. This product will then either float to the surface of the liquid, if it is lighter than the carrier liquid, or sink to the bottom if it is heavier. This 'capture and release' feature is an important characteristic of the composition's capabilities for use in methods of the invention, as it allows equipment to be designed which can either capture the oil in the media for immediate disposal, such as disposable filters, or capture and release the oil (i.e. coalesced oil flows downstream) to a downstream separator unit such as a separator, a gravity oil water separator, such as an American Petroleum Institute (API) gravity oil water separator, skimmer. Other existing technologies are also useful, such as pumping or flowing oil off the water surface or using a pressurized vessel (e.g. 10-20 psi) in which oil collects near the top of the vessel and is forced out.

Another aspect of the invention relates to an apparatus for separating oil or oleophilic contaminants from a carrier, comprising media, filter or separator of the invention for contacting a first carrier flow of the carrier to absorb emulsified oil. Optionally, the media, filter or separator is received in a housing having an inlet an outlet in fluid communication. The media, filter or separator is located in the fluid flow path between the inlet and outlet.

Another aspect of the invention relates to an apparatus for separating oil or other oleophilic contaminants from a carrier, comprising: an upstream media, upstream filter or upstream separator of the invention for contacting a first carrier flow of the carrier to absorb emulsified oil and produce a downstream second carrier flow, wherein once the upstream media, upstream filter or upstream separator becomes saturated with oil, it releases free floating oil into the second carrier flow; a downstream media, downstream filter or downstream separator for receiving the second carrier flow and collecting the free floating oil.

In the apparatus, the downstream separator optionally comprises a gravity oil water separator. The apparatus optionally comprises a housing having an inlet and an outlet in fluid communication. The upstream media, filter or separator and the downstream media, filter or separator are located in the fluid flow path between the inlet and outlet.

In the capture and release embodiment, the oil can be collected and re-cycled, and the separator equipment can work indefinitely without requiring media replacement due to saturation. If one wishes to change filters before or after saturation occurs, one optionally monitors filters and separators to determine when saturation with oil will occur. To monitor filter or separator function, one can optionally use either a downstream oil content monitor on the discharge, or install several filters or separators in series. For example, filters may be installed in series in transparent or translucent cartridges. When oil flows through the saturated first filter, one can see the second filter starting to discolour. In a three filter series one can take out the saturated (contaminated) upstream filter from the first position and dispose of it. Optionally one replaces it with a new filter or one can take out the 2nd filter from the second position in the middle and move it to the first position. In a three filter series, one can also then take the 3rd filter and move it back to the 2nd position, and then put a new filter in the 3rd filter position downstream.

Since the composition can be applied to practically any media, it may be used in many different equipment arrangements and applications to achieve varying results. Examples of two different media materials to which the composition is optionally applied are granular perlite and polypropylene fabric. As noted above, examples of two different equipment arrangements and applications in which these different substrates can be used are filters and oil/water separators.

Media (also called substrate material) on which the compositions are stored are typically permeable solid materials, such as filters. For filters, polypropylene is one material commonly used. Polypropylene filters are manufactured in a variety of forms including string wound polypropylene, spun wound polypropylene and melt blown polypropylene. These filters are often manufactured as disposable cartridges, are often cylindrical in shape, and are typically installed inside rigid cartridge housings. They can also be bought in other shapes and forms. Cartridge filters are commonly used to remove particulate matter, oil or other contaminants from waste streams, usually via adsorption, absorption or filtering of the contaminant from the carrier liquid. Manufacturer's objectives when making such filters is to maximize the volume of contaminant which can be removed by the filter from a waste stream before it becomes saturated or clogged. In this respect, compositions of the invention can be applied to these filter materials to make them remove oil and other contaminants much more effectively. After a composition is applied to the filter, and oily water is passed through it, the filter will adsorb oil droplets and other contaminants from the waste stream onto the filter substrate, cleaning the water as it passes through. The amount and type of contaminants which the composition will remove through this process varies with the type of media used, its surface area, the size of pore spaces in the substrate material, the strength of formula applied, and the type of contaminant being removed. A larger filter surface will hold a larger volume of contaminant before saturating, and will provide more time for the attraction process to work, resulting in better removal efficiencies. Smaller pore spaces in the material improve removal efficiencies by forcing smaller contaminant molecules to pass closer to the treated substrate surface, resulting in a better attraction process. However, this improvement must be weighed against the fact that smaller pore spaces in many field applications will also result in the filter clogging up faster with unintended contaminants such as particulate matter, if they are present in the water. The contaminated water is optionally pressurized when it contacts the compositions, optionally at 100 psi or less, although pressures greater than 100 psi are also useful.

The compositions of this invention separate the oil contained in the chemical emulsion by changing it to a form which can coalesce with other oil particles to form free floating product through simple passage of the affected liquid through a substrate treated with the composition.

Some examples of applications where chemically emulsified oils presently pose problems for industry and in which the compositions and methods of the invention are usefully applied include: In the bilge water of ships, chemical emulsions occur due to washing down vessels with soapy (surfactant based) water, which then ends up in the bilge of the ship. When this soap mixes with the oil residues in the water, chemical emulsions are formed. The compositions of this invention are useful in an oily water separator to separate such emulsions from the bilge water in one passive operation; Car washes use surfactants to clean vehicles, and in so doing wash oil and grease off the vehicles as well. These combine with water to create chemical emulsions in the resulting waste discharge; Soil washing operations use surfactants and water to clean oil from contaminated soil. The resulting discharge liquid from these operations contains large amounts of chemically emulsified oils which are costly to remove, rendering many soil washing operations too costly, or technically and environmentally challenging, to be used. The compositions of this invention are useful to separate the chemical emulsions from the wash water directly at the site of soil washing operations, making such operations much more cost effective and technically feasible. Residential and industrial waste discharges from buildings often go into town sewerage and storm sewerage systems, ending up at centralized waste treatment facilities. Significant amounts of surfactants enter this discharge stream from the use of detergents and soaps in domestic residences. Oil residues also enter these discharges from various run-off sources, creating chemical oil emulsions which are again difficult to remove at the treatment plant.

Thus, the methods of the invention also relate to methods of separating oil, such as chemically emulsified oil, from bilge water, car wash waste water, soil washing waste water and residential or industrial building waste water, comprising contacting the water with a composition of the invention, for example, in media or a filter or separator containing a composition of the invention.

The ability of the compositions and methods of the invention to separate chemically emulsified oils in a simple and passive manner provides a practical solution for separation of oil and water. For example, surfactants can purposely be added to underground oil bearing reservoirs to improve oil recovery from the reservoirs at a lower cost, based on the fact that the oil and water can now be economically separated at the surface to produce water clean enough to discharge to the environment without further treatment.

The compositions and methods of the invention are also useful for separating other contaminants, such as sulphides, ammonia, phenols and grease, from waste water and other carriers. While oil pollution is a significant problem, industry, such as the petrochemical industry, also generates many other waste compounds which eventually find their way into a discharge stream to be disposed of into the environment. Many of these compounds have strictly regulated concentrations above which they cannot be discharged into the environment. This results in a need for industries to treat their effluent before disposing of it. The present invention removes all of the aforementioned contaminants in one simple operation. Most prior technologies involve costly systems incorporating a number of treatment processes including addition of chemicals, pH adjustment, coagulation, flotation, aeration, etc. Such systems are generally expensive to install and maintain. The present invention provides a simple and economical solution to purifying water of contaminants such as sulphides, ammonia, phenols and grease, with one process. In a preferred embodiment, these contaminants are removed from oily water. Thus, the methods of the invention also relate to methods of separating sulphides, ammonia, phenols and grease from water (for example, oily water, such as chemically emulsified oily water), comprising contacting the water with a composition of the invention, for example, in media or a filter, separator containing a composition of the invention.

Industry also generates many waste compounds containing heavy metals so effluent water has to be treated before disposal. Various technologies currently exist for removing heavy metals from water, but many are costly to install and maintain. The compositions and methods of this invention are effective in removing heavy metals, for example, through the process of running an aqueous fluid through a substrate treated with the composition. Thus, the methods of the invention also relate to methods of separating heavy metals from water (for example, oily water, such as chemically emulsified oily water), comprising contacting the water with a composition of the invention, for example, in media or filter, separator containing a composition of the invention.

Listed below are applications and examples in which the formulated media, a hydrocarbon resin and a drying oil is effective in removing and converting contaminants from a waste stream, whether in the gaseous or liquid phase.

The invention relates to compositions and methods for removing/converting Volatile organic compounds (VOCs), Particulates, Nitrogen oxides, Sulphur oxides, Carbon Monoxide and other contaminants (particularly oleophilic compounds) from air and other carriers. It is also particularly useful for removing heavy metals, such as mercury, PCB's, ammonia, phenols, grease, MTBE (methyl tertiary butyl ether), etc.

Since the composition can be applied to practically any media, it can be used in many different equipment arrangements and applications to achieve varying results.

1. Removal of Oils and Oil Mists
    This technology can be used to remove oils and oil mists from various effluents and gaseous carriers.
2. Reduction/Conversion of Noxious Gas Emissions
    This technology can be used on small 2 cycle engines to large vehicles in one passive operation. The filters can be easily adapted to fit existing machines already in the marketplace. For example, tractors used for pulling garbage bins stored in inside rooms. Gas powered machines needed for jobs in poorly ventilated areas as well as vehicles and tractors of all shapes and sizes.
3. Conversion and Removal of Elemental Sulphur ($S_8$)
    The invention advantageously solidifies sulphur from raw fuels such as gasoline. Therefore, sulphur is eliminated from the combustion process which otherwise would produce harmful gases such as sulphur dioxides and other oxide derivatives of sulphur.
4. Removal of Flue Gases from Smoke Stacks
    Flue gases are produced when coal, oil, natural gas, wood, garbage, rubber tires or any other fuel is combusted in an industrial furnace, a power plant, steam-generating boiler, or other large combustion device. Flue gas is usually composed of nitrogen and excess oxygen remaining from the intake combustion air. It also contains pollutants such as particulate matter, carbon monoxide, nitrogen oxides and sulfur oxides. These contaminants result in formation of smog, ground level ozone, acid rain etc, Reducing these emissions with the use of the Composition could save thousands of lives each year.

5. Conversion of Aqueous Sulphur to a Solid Form
   The formulated invention can be used to easily remove sulphur from caustic soda from industrial effluents. This process has significant benefits, given caustic soda can be reused in industrial applications, as well as protecting the environment.
6. Treatment of Exhaust from Diesel Engines
   The composition of the formulated media is useful for treatment of exhaust fumes from the combustion of diesel. These engines are the most efficient power plant among all known types of internal combustion engines. Heavy trucks, urban buses, and industrial equipment are powered almost exclusively by diesel engines all over the world. In Europe, diesel powered cars have been increasingly popular. The diesel engine is a major candidate to become the power plant of the future. Before that happens, however, further progress in diesel emission control is needed. Environmental benefits of diesels, such as low greenhouse gas emissions, are balanced by growing concerns with emission of nitrogen oxides and diesel particulates. Increasingly tighter environmental regulations worldwide call for advanced emission controls and near-zero diesel emission levels in the years to come.
7. Treatment Off Exhaust from Internal Combustion Engines
   Internal combustion engines are significant contributors to air pollution, which has a damaging impact on our health and the environment and is suspected to cause global climate changes. The Invention when applied as a converter is much more superior to current catalytic converters which only work at high temperatures, >400° C. This converter works on the cold side after the tailpipe/smokestack to convert gases into water as soon as the engine/burner is started, attracts/converts gases and pollutants without the need for fine filtration and is not easily plugged, in most cases movement of a machine or a shaker attachment will ensure no plugging.
8. Separating Oil from the Tar Sands in Alberta
   An example of a major air pollution contributor in Canada is the Alberta Tar Sands. The process currently used for the removal of oil from the Alberta Tar Sands alone will contribute up to 60% of all emission generated in Canada in the near future. Air pollutants enter the environment by the heating of the water by burning fossil fuels to separate the oil from the sands. This process could increase oil recovery from reject tailings, as well as lower energy costs required to heat the oil/sand mixture.
9. Control Emissions Inside Closed or Poor Ventilated Buildings
   For example, operation of a vehicle inside closed areas is now possible due to the reductions in Carbon Monoxide and noxious gases with the use of the invention. The ability of the compositions and methods of the invention to remove/capture contaminants in a simple and passive manner provides a practical solution for removal/converting of contaminants from air.

The above applications and examples are examples of where the formulated media according to the present invention will be beneficial both environmentally and socio-economically on the world market.

EXAMPLE 1

Preparation of Remediation Composition

One liter of hydrocarbon resin (Nevtac-10; Neville Chemical Co.) was heated until it became less viscous (Nevtac-10 hydrocarbon resin softens at 10° C. so heating may not be necessary at warm room temperatures). Once the hydrocarbon resin was heated to a free flowing consistency, it was mixed with about 1.9 L of tung oil (two 946 mL containers of tung oil; Minwax Tung Oil Protective Finish; Minwax Company) in a plastic bucket.

A portion of the hydrocarbon resin/tung oil mixture was removed until approximately 1 L remained in the bucket (as measured by markings on the interior of the bucket). Impregnation composition was prepared by adding seven liters of camp fuel (naphtha; Escort Camp Fuel Iosol; Tri Leaf Distribution Trifuel) to the bucket to obtain a total volume of 8 L of measured according to markings on the interior of the bucket. The liquid in the bucket was a yellow-brown colour. Next, another 1 L portion of the hydrocarbon resin/tung oil mixture was combined with 7 L of camp fuel. Next, the remaining portion of hydrocarbon resin/tung oil (measured at about 0.5 L according to markings on the interior of the bucket) was mixed with 3.5 L of camp fuel (naphtha). The hydrocarbon resin/tung oil and camp fuel could be mixed together to make a single batch of impregnation composition in one large bucket if desired.

An estimated 2.5 cubic feet of perlite (Premier Pro-Perlite; Les Tourbieres Premier Ltee) was provided in a plastic bag and the impregnation composition was poured into the bag. The perlite and composition were mixed by sealing and turning the bag for less than 5 minutes. Excess composition was drained by puncturing the bottom of the bag.

The perlite was then dried for 30 mins at 300° Fahrenheit until some volatile components substantially evaporated to form media impregnated with cured remediation composition according to the present invention.

The following examples represent oil removal results which can be achieved when the compositions of the invention are impregnated into particular substrates (media) at the specified water particular flow rates and other specified conditions. Many potential variations are readily made.

The compositions of the invention provide good removal efficiencies for oily water either containing chemical emulsions or not containing chemical emulsions. Examples of typical oil removal efficiencies achieved using the compositions on filters, in the presence of both chemically emulsified and non-chemically emulsified oils, are summarized in the example #2 and #3 results noted below.

EXAMPLE 2

Oil Removal Efficiency Using the Composition on Disposable Cartridge Filters, in the Presence of Chemical Emulsions Type of filter: Spun wound polypropylene cartridge filter
Size of filter: 250 mm high.times.63.5 mm diameter, with a 25.4 mm diameter hollow core
Water flow rate: 9 L/min.
Carrier fluid: Fresh water. Test fluid Mixture: 399 ppm oil in water, consisting of 77 ml of oil and 193 L of water
Oil type used: 70 ml of 'Bunker' C oil plus 7 ml of diesel oil
Density of oil mixture: 970 g/ml Surfactant used: 25 ml (129 ppm)
Oil test equipment used: Electronic Oil Content Monitor, (Rivertrace Engineering, certified to MEPC.107(49))
Test fluid preparation: Water, oil and surfactant mixed continuously in large tank using a 3,500 rpm centrifugal pump, ensuring that no free oil is visible on the water surface throughout the test. Test Set-up: A submersible pump is placed in the tank and connected to a 12 mm diameter discharge hose. A vertical filter housing is placed in-line in this hose, downstream of the pump, and a polypropylene filter cartridge is installed in the housing. An in-line Oil Content monitor is attached to the discharge hose downstream of the filter, to sample water quality discharging from the filter.

Test procedure:
1. Weigh filter cartridge dry;
2. Install filter cartridge in housing and feed clean water through it at 19 L/min for 5 mins to saturate it with water;
3. Activate the submersible pump, and pump the oily test fluid through the filter cartridge.
4. Record oil concentrations in the discharge water every minute. Keep operating until an oil sheen is observed on the discharge water, or a sustained rise in oil concentrations is observed in the discharge water;
5. Calculate the amount of oil removed by the filter from the volume of water which went through the filter, and applying the amount of oil which was removed (the difference between inlet and outlet oil concentrations);
6. Define oil removal efficiency of the filter as the percentage of its dry weight which is removed in oil.

Test Results:

| Time (min) | Inlet oil concentration (ppm) | Discharge oil concentration (ppm) | Reduction (%) |
|---|---|---|---|
| 1 | 399 | 0 | n/a |
| 2 | 399 | 24.3 | 93.9 |
| 3 | 399 | 25.9 | 93.5 |
| 4 | 399 | 26.7 | 93.3 |
| 5 | 399 | 27.2 | 93.2 |
| 6 | 399 | 18.4 | 95.4 |
| 7 | 399 | 14.4 | 96.4 |
| 8 | 399 | 14.1 | 96.4 |
| 9 | 399 | 14.6 | 96.3 |
| 10 | 399 | 15.0 | 96.2 |
| 11 | 399 | 15.1 | 96.2 |
| 12 | 399 | 15.9 | 95.7 |
| 13 | 399 | 17.1 | 95.7 |
| 14 | 399 | 18.1 | 95.5 |
| 15 | 399 | 18.7 | 95.3 |
| 16 | 399 | 19.1 | 95.2 |
| 17 | 399 | 19.3 | 95.2 |
| 18 | 399 | 20.0 | 95.0 |
| 19 | 399 | 20.1 | 95.0 |
| 20 | 399 | 40+ | End of test |
| Ave: (to 19 mins) | 399 | 19.1 | 95.2 |

Amount of oil removed by filter=(19 mins.times.9 L/min).times.(399 ppm–19.1 ppm).times.0.97 g/L=63.0 grams
Dry weight of filter=190 grams Removal efficiency of filter with chemical emulsions as a percentage of the filter's dry weight=63.0 g/190 g=33.2%

EXAMPLE 3

Oil Removal Efficiency Using the Composition on Disposable Cartridge Filters in the Absence of Chemical Emulsions, but in the Presence of Mechanical Emulsions Type of filter: Spun wound polypropylene cartridge filter.
Size of filter: 250 mm high.times.63.5 mm diameter, with a 25.4 mm diameter hollow core.
Water flow rate: 9 L/min. Carrier fluid: Fresh water.
Test fluid Mixture: 393 ppm oil in water, consisting of 10 ml of oil and 25.5 L of water.
Oil type used: 9 ml of 'Bunker' C oil plus 1 ml of diesel oil.
Density of oil mixture: 970 g/ml
Surfactant used: None
Oil test equipment used: Electronic Oil Content Monitor, (Rivertrace Engineering, certified to MEPC.107(49)).

Test fluid preparation: Water and oil mixed continuously in large tank using a 3,500 rpm centrifugal pump, ensuring that no free oil is visible on the water surface throughout the test.

Test Set-up: A submersible pump is placed in the tank and connected to a 12 mm dia. discharge hose. A vertical filter housing is placed in-line in this hose, downstream of the pump, and a polypropylene filter cartridge is installed in the housing. An in-line oil content monitor is attached to the discharge hose, downstream of the filter, to sample water quality discharging from it.

Test Procedure:
1. Weigh filter cartridge dry; 2. Install filter cartridge in housing and feed clean water through it at 19 L/min for 5 mins to saturate it with water;
3. Activate the submersible pump, and pump the oily test fluid through the filter cartridge.
4. Record oil concentrations in the discharge water every minute. Keep operating until an oil sheen is observed on the discharge water, or a sustained rise in oil concentrations is observed in the discharge water;
5. Calculate the amount of oil removed by the filter from the volume of water which went through the filter, and applying the amount of oil which was removed (the difference between inlet and outlet oil concentrations);
6. Define oil removal efficiency of the filter as the percentage of its dry weight which is removed in oil.

Test Results:

| Time (min) | Inlet oil concentration (ppm) | Discharge oil concentration (ppm) | Reduction (%) |
|---|---|---|---|
| 1 | 393 | 0 | 100.0 |
| 2 | 393 | 0 | 100.0 |
| 3 | 393 | 2.6 | 99.3 |
| 4 | 393 | 4.1 | 99.0 |
| 5 | 393 | 2.6 | 99.3 |
| 6 | 393 | 1.9 | 99.5 |
| 7 | 393 | 2.7 | 99.3 |
| 8 | 393 | 3.4 | 99.1 |
| 9 | 393 | 2.9 | 99.3 |
| 10 | 393 | 0.4 | 99.9 |
| 11 | 393 | 0.7 | 99.8 |
| 12 | 333 | 0.9 | 99.8 |
| 13 | 393 | 1.0 | 99.7 |
| 14 | 393 | 1.1 | 99.7 |
| 15 | 393 | 1.7 | 99.6 |
| 16 | 393 | 1.7 | 99.6 |
| 17 | 393 | 0.9 | 99.8 |
| 18 | 393 | 0.4 | 99.9 |
| 19 | 393 | 0.5 | 99.9 |
| 20 | 393 | 0.7 | 99.8 |
| 21 | 393 | 0.2 | 99.9 |
| 22 | 393 | 0.2 | 99.9 |
| 23 | 393 | 0.3 | 99.9 |
| 24 | 393 | 0.6 | 99.8 |
| 25 | 393 | 0.4 | 99.9 |
| 26 | 393 | 0.4 | 99.9 |
| 27 | 393 | 0.5 | 99.9 |
| 28 | 393 | 0.5 | 99.9 |
| 29 | 393 | 0.0 | 100.0 |
| 30 | 393 | 0.0 | 100.0 |
| 31 | 393 | 0.2 | 99.9 |
| 32 | 393 | 2.2 | 99.4 |
| 33 | 393 | 2.0 | 99.5 |
| 34 | 393 | 2.2 | 99.4 |
| 35 | 393 | 2.2 | 99.4 |

-continued

| Time (min) | Inlet oil concentration (ppm) | Discharge oil concentration (ppm) | Reduction (%) |
|---|---|---|---|
| 36 | 393 | 2.9 | 99.3 |
| 37 | 393 | 1.7 | 99.6 |
| 38 | 393 | 2.2 | 99.4 |
| 39 | 393 | 3.0 | 99.2 |
| 40 | 393 | 3.7 | 99.3 |
| 41 | 393 | 0.9 | 99.8 |
| 42 | 393 | 0.9 | 99.8 |
| 43 | 393 | 1.9 | 99.5 |
| 44 | 393 | 2.4 | 99.4 |
| 45 | 393 | 1.4 | 99.6 |
| 46 | 393 | 1.9 | 99.5 |
| 47 | 393 | 2.4 | 99.4 |
| 48 | 393 | 3.3 | 99.2 |
| 49 | 393 | | |
| 50 | 393 | 0.9 | 99.8 |
| 51 | 393 | 2.5 | 99.5 |
| 52 | 393 | 3.4 | 99.1 |
| 53 | 393 | 3.4 | 99.1 |
| 54 | 393 | 1.0 | 99.7 |
| 55 | 393 | 1.9 | 99.5 |
| 56 | 393 | 2.1 | 99.5 |
| 57 | 393 | 2.2 | 99.4 |
| 58 | 393 | 0.7 | 99.8 |
| 59 | 393 | 1.2 | 99.7 |
| 60 | 393 | 2.6 | 99.3 |
| 61 | 393 | 1.9 | 99.5 |
| 62 | 393 | 1.2 | 99.7 |
| 63 | 393 | 2.1 | 99.5 |
| 64 | 393 | 4.9 | 98.8 |
| 65 | 393 | 1.0 | 99.7 |
| 66 | 393 | 1.9 | 99.5 |
| 67 | 393 | 2.2 | 99.4 |
| 68 | 393 | 2.4 | 99.4 |
| 69 | 393 | 1.1 | 99.7 |
| 70 | 393 | 2.9 | 99.3 |
| 71 | 393 | 3.1 | 99.2 |
| 72 | 393 | 3.9 | 99.0 |
| 73 | 393 | 3.1 | 99.2 |
| 74 | 393 | 0.1 | 100.0 |
| 75 | 393 | 0.9 | 99.8 |
| 76 | 393 | 3.2 | 99.2 |
| Ave: | 393 | 1.71 | 99.6 |

Amount of oil removed=(76 mins.times.9 L/min).times.(393 ppm−1.71 ppm).times.0.97 g/L=259.6 grams Weight of filter dry=190 grams Removal efficiency of filter without chemical emulsions as a percentage of the filter's dry weight=259.6 g/190 g=137%

(note: No sheen or elevated readings were recorded to this point, so removal efficiency would be higher if test was continued.)

When the filter becomes saturated with oil, it begins releasing oil to the downstream discharge. The particles released in this process are larger than when they entered the filter, as a result of coalescing of oil particles caused by the composition as they passed through the filter. This is important for non-filter applications, as it allows the filter to be used as a 'conditioning unit', instead of only as a filter, for coalescing small oil particles into larger droplets, and thereby changing emulsified oils into free floating product for more efficient removal by other downstream equipment.

In this regard, another preferred substrate material for the compositions of the invention is perlite, because of its high surface to weight ratio and porosity. This material provides increased surface contact areas for fluids passing through it, and can be used in treatment equipment as either large or small beds of granular material. Following treatment with the compositions, when oily water is passed through the perlite, it again attracts oil and other contaminants to its surface, where the oil molecules coalesce into larger droplets. These are held on the surface of the perlite until it becomes saturated, following which the coalesced droplets release into the downstream discharge as larger droplets. Most of these are then large enough to float freely (or sink, depending on the relative density of the oil and the carrier fluid being used). The extent of contaminant removal which can be achieved with perlite can be varied by altering the gradation of the substrate material (i.e. pore space size), the amount of perlite used, and the flow rate through the material.

As with the previous filter tests, oil removal efficiencies are different for chemically emulsified oils versus non-chemically emulsified oils. However, varying efficiencies for both can be obtained by combining different removal techniques and materials together. For maximizing removal of chemical emulsions, and providing a system which can operate indefinitely without its removal efficiency declining, a filter can be used as a conditioning unit upstream of a separator such as perlite separator. The filter in this arrangement causes the smaller oil particles to coalesce into larger droplets, and the separator downstream can then remove even chemical emulsions more efficiently. To illustrate this, an example of a typical test carried out using this arrangement is illustrated below;

EXAMPLE 4

Oil Removal Efficiency Using the Composition, in the Presence of Chemical Emulsions, on a Combination Filter Cartridge and Perlite Separator Arrangement Type of filter: String wound polypropylene cartridge filter, as described in example 1.

Size of filter: 500 mm high.times.100 mm diameter, with a 25.4 mm diameter hollow core.

Water flow rate: 19 L/min.

Carrier fluid: Fresh water.

Test fluid Mixture: Varied from 130 ppm to 728 ppm emulsified oil in water.

Oil type used: Diesel oil.

Density of oil mixture: 850 g/ml Surfactant used: 3.1 ppm.

Oil test equipment used: Electronic Oil Content Monitor, (Rivertrace Engineering, certified to MEPC.107(49)).

Test fluid preparation: Water, oil and surfactant were mixed continuously in a large tank, using a 3,500 rpm centrifugal pump, ensuring that no free oil was visible on the water surface throughout the test.

Test Set-up: A submersible pump was placed in the tank and connected to a 12 mm dia. discharge hose. A vertical filter housing was placed in-line in this hose, downstream of the pump, and a polypropylene filter cartridge was installed in the housing. Downstream of the filter cartridge an enclosed vertical separator tank was installed, measuring 250 mm diameter by 760 mm high. A partial height partition was installed inside this tank to divide it into two equal compartments. The divider partition extended from the bottom of the tank up to an height of 500 mm. Any water entering the tank at the bottom had to travel up over the top of this partition, and down the other side to exit the tank. The tank was filled to the top of the partition on each side with treated 3/16" granular perlite, as described in example one, leaving a space of 50 mm at the bottom to accommodate water entry. An in-line Oil Content monitor was attached to the discharge from this separator, to sample water quality discharging from it.

Test Procedure:
1. Pump the oily test water through both the filter and separator;
2. Record oil concentrations in the water at the filter exit as well as the separator exit;
3. Continue pumping until oil concentrations in the discharge water stabilize at a constant level;
4. Define the oil removal efficiency of the separator as the oil removal rate which can be maintained indefinitely by the system.

In the following test, the oil removal efficiency of the separator is defined as the removal rate which is achieved between the filter discharge and the separator discharge, not the filter inlet and the separator discharge. This was done intentionally to ensure that removal rates displayed here were testing only the removal rate for emulsified oils contained in the water. If the oil concentration of the filter inlet liquid was used in this calculation, the resulting removal rate would be significantly higher, as it would include some free oil as well, which would increase the total apparent oil removal rate.

Test Results:

| Time (min) | Oil concentration after filter (ppm) | Oil concentration after separator (ppm) | Reduction (%) |
| --- | --- | --- | --- |
| 0 | | 0 | n/a |
| 4 | | 1.5 | n/a |
| 6 | 130 | 2.5 | 98.1 |
| 8 | | 2.8 | |
| 10 | 182 | 3.1 | 98.3 |
| 12 | | 3.6 | |
| 14 | 728 | 4.1 | 99.4 |
| 18 | 624 | 5.2 | 99.2 |
| 20 | 468 | 5.4 | 98.8 |
| 22 | 312 | 5.6 | 98.2 |
| 24 | | 3.5 | |
| 27 | 312 | 3.8 | 98.8 |
| 30 | 312 | 4.6 | 98.5 |
| 34 | 312 | 4.5 | 98.6 |
| 38 | 286 | 6.8 | 97.6 |
| 39 | 312 | 7.9 | 97.5 |
| 41 | 593 | 15.0 | 97.5 |
| 45 | | 12.0 | |
| 47 | 416 | 14.0 | 96.6 |
| 50 | | 16.0 | |
| 55 | 493 | 17.0 | 96.6 |
| 61 | | 11.0 | |
| Ave: | 495.2 | 7.14 | 98.6 |

Removal efficiency of system: This combination of equipment allows chemically emulsified oils to be removed at a rate of 98.6% versus the previous removal rate of 95.2% observed for the filter alone, in Example 2. This arrangement of equipment also allows the system to perform in this manner indefinitely, as opposed to the short time frame to saturation using a filter alone.

Another characteristic of the composition of the invention is that it can remove water from oil as well as oil from water. Test results carried out on the oil captured and released by the perlite substrate material above, and subsequently collected as free product, was found to have a water content of less than 0.5%, allowing the technology it to be used in methods for de-watering oil by contacting the oil with a composition, media, or separator of the invention.

Oil removal rates offered by compositions of the invention are affected by the substrate material used, as noted above, but also by the flow rate of fluid passing through the substrate material. Slower flow rates can cause an excessive build up of oil on the substrate material, resulting in reduced efficiency for attracting subsequent oil particles, while faster flow rates can cause reduced media contact time, thereby reducing the oil removal rate. A useful flow rate is readily determined based on the type and amount of substrate material used, and the type of contaminant involved.

EXAMPLE 5

Sulphides/Ammonia/Phenols/Oil & Grease

The compositions are effective in removing sulphides, ammonia, phenols and oil & grease, all in one process, without addition of any chemicals to the water. To demonstrate this, a test was carried out on a liquid waste from an oil refinery, with the following results:

Test Procedure:
A 65 liter sample of waste fluid was obtained from the inlet to the waste treatment plant, representing an oily/water inlet mixture (test #1);
A 65 liter sample of waste fluid was obtained from the waste treatment plant part way through its treatment process (test #2);
A 65 liter sample of waste liquid was obtained near the end of the treatment process (test #3):

Each of these samples was pumped through a coarse 3/16" perlite media, with a 14" dia tank with a depth of 28". No conditioning unit or filter was used in the this test; Then water was tested before and after it passed through the separator media for each of the above tests, with water samples being sent to an accredited testing laboratory for lab testing.

Results of these tests were as follows:
TEST #1: (Raw Inlet Fluid):

| Parameter | Inlet concentration (ppm) | Outlet Concentration (ppm) | Reduction |
| --- | --- | --- | --- |
| TPH | 17.0 | 4.3 | 75% |
| Ammonia | 5.4 | 1.9 | 65% |
| Phenols | 1.6 | 0.49 | 69% |
| Sulphides | 0.69 | 0.06 | 91% |

Test #2: (Midpoint of Treatment Process):

| TPH | 17.0 | 7.3 | 57% |
| --- | --- | --- | --- |
| Ammonia | 8.0 | 3.3 | 59% |
| Phenols | 0.89 | 0.30 | 66% |
| Sulphides | 0.44 | Non-Detectable | 100% |

Test #3: (End of Treatment Process)

| TPH | 0.2 | Non-Detectable | 100% |
| --- | --- | --- | --- |
| Ammonia | 0.47 | 0.30 | 36% |
| Phenols | 0.005 | 0.003 | 40% |
| Sulphides | Non-Detectable | Non-Detectable | — |

If smaller gradation media treated with the composition of this invention was used above, it has been found that significantly improved removal rates would be obtained for all of the above compounds, as smaller media forces the particles closer to the coalescing surface, thereby increasing the effectiveness of the media in attracting the target molecules.

EXAMPLE 6

Heavy Metal Removal

The compositions of the invention are effective in removing heavy metals through the process of running an aqueous fluid through a substrate treated with the composition. The following test was carried out to demonstrate this effectiveness:

Test Procedure:
1. A contaminated groundwater well was selected for testing where the groundwater was known to contain elevated levels of heavy metals;
2. A separator and pump system was installed near the well, and groundwater was pumped through it for treatment;
3. The separator consisted of a cylindrical tank filled with 5.7 cubic feet of coarse perlite material treated with a composition of the invention, with a 28" depth and 14" dia and a particle size of 3/16";
4. Water was continuously pumped through the separator for more than 10 volume changes before any testing was commenced. Water samples were then extracted at a point where the water entered the separator and another point where it left the separator for testing.

Results of these tests were as follows:

| Parameter | Inlet Concentration (ppb) | Outlet Concentration (ppb) | Reduction |
|---|---|---|---|
| Aluminum | 12 | non-detectable | 100% |
| Arsenic | 11 | 7.1 | 35.5% |
| Barium | 78 | 72 | 7.7% |
| Cobalt | 1.3 | 1.2 | 7.7% |
| Iron | 2400 | 68 | 97.2% |
| Lead | 52 | 17 | 67.3% |
| Uranium | 0.2 | non-detectable | 100% |
| Zinc | 17 | 13 | 23.5% |

The level of metals decreased by about 100% in the case of aluminum and uranium. Close to 100% of iron was removed.

EXAMPLE 7

Preparation of a Filter Unit for Decontaminating a Gas

A cartridge-type filter housing is provided. A filter medium is prepared, consisting of a conventional medium such as steel wool wire, granular perlite, glass fiber filters, or any other suitable medium. The medium is impregnated with the remediation composition, and the impregnated medium is housed within the housing. The filter unit includes additional conventional filter components such as fittings for inlets and outlets, pressure release valves and other components that render the filter suitable for its intended purpose. Such fittings, components and other like aspects are known to those skilled in the art, and are of a conventional nature. The filter unit can be attached to a source of contaminated gas emanating through an exhaust pipe, smoke stack, or other conduit. The gas source may comprise any one of a wide variety of emission sources, including without limitation an internal combustion vehicle, watercraft or aircraft, a stationary industrial source such as a factory, power plant, smelter, or oven, a commercial or institutional source such as a kitchen, heating plant, or farm.

After a composition comprising a hydrocarbon resin and a drying oil is applied to the media, and contaminated air is passed through it, the filter will adsorb/convert noxious gases and other contaminants from the waste/air stream onto the filter substrate, cleaning the air as it passes through. The amount and type of contaminants which the composition will remove through this process varies with the type of media used, its surface area, the size of pore spaces in the substrate material, the strength of formula applied, and the type of contaminant being removed.

EXAMPLE 8

Removal/Conversion Efficiency Using the Composition on a Hydrocarbon Resin and a Drying Oil Perlite, to Filter Emissions from a Wood Burning Stove Type of filter: Round Steel Canister 8"×8", 3/16" treated perlite according to example 1

Air Flow: 100 cfm

Carrier: Air

Test apparatus/set up: Using a standard household woodstove, bunker oil, rubber tire pieces and wood pellets were burned to create a black plume, which an unpleasant smell could be inhaled over 40 ft away. The filter canister was installed in-line with the stove chimney such that 100% of the effluent flowed through the filter. The canister base was located 60 cm. from the stove outlet. The Flow was diverted in two directions with shut-off valves and measurement was calculated with appropriate testing equipment.

Test Results

| Test Parameters | Percentage Reduction (%) |
|---|---|
| Particulate Matter | 97 |
| Sulphur Dioxide | 74 |
| Nitrogen Oxides | 72 |
| Carbon Monoxide | 95 |

Visual Observations: No black smoke visible; generated steam and water; and, could inhale the exhaust without any smell or eye irritants.

EXAMPLE 9

Removal/Conversion Efficiency Using a Disposable Cartridge Filters, on the Exhaust of a 3 hp Honda, 4 Cycle Gas Engine Type of filter: Spun wound 5 micron polypropylene cartridge filter with a 10" housing.

Size of filter: 250 mm high×63.5 mm diameter, with a 25.4 mm diameter hollow core.

Air Flow: 50 cfm

Carrier: Air

Test apparatus/set up: A 1800 watt generator with a 3 hp Honda 4 cycle gas engine was provided with one 10"×2½" treated filter, room measuring 10 ft×10 ft×8 ft. A Kidde Carbon monoxide alarm, model # KN-COPP-3, (manufactured August 2006) was located in the room 5 ft away, which measures Co2 concentrations, from the gas engine. The alarm was plugged into a 110 outlet. The engine was started with the filter attached and in operation, and allowed to run on "idle" throughout the test.

Test Results
Without Filter

| Generator Run Time (Min) | Carbon Monoxide Concentration (ppm) |
|---|---|
| 1 | 150 |
| 2 | 220 |
| 3 | 284 |
| 4 | 390 |
| 5 | 554 |

After 5 minutes the CO detector went off and the engine was shut down and allowed to cool down.
With Filter

| Generator Operation Time (Min) | Carbon Monoxide Concentration (ppm) |
|---|---|
| 5 | 30 |
| 12 | 80 |
| 20 | 135 |

After 20 minutes the engine was shut off.

After clearing the room of smoke and allowing the CO detector to return to 0 ppm, a comparison was made with the concentration of CO emitted by a single cigarette. A cigarette was lit in the room 12 inches from the detector and allowed to burn without drawing any additional air through the cigarette. After 1 min the CO detector read 180 ppm. A single cigarette thus produced 1.34 times the carbon monoxide in the room after one minute than the carbon monoxide that was expelled from the filtered exhaust after 20 minutes in operation.

EXAMPLE 10

The emissions from a 2005 GMC pickup with a 4.8 liter engine, were measured with an approved Ontario Government analyzer # A1351/DC and conducted on a dynamometer, with the truck operating at 40 Km/hr.

Type of filter: Canister filled with 3/16" treated perlite according to example 1.
Size of filter: 16" W×30"H×6" depth
Air flow: 300 cfm (average)
Test Results
Test Run without Canister

| Chemical Parameter | Emission Limit (ppm) | Percentage Measured |
|---|---|---|
| Carbon Monoxide (CO) | 0.25 | 0% |
| Nitrous Oxides (NOx) | 473 | 4 ppm |
| Carbon Dioxide ($CO_2$) | N/A | 14% |
| Total Hydrocarbons (HC) | 45 | 8 ppm |

Test Run with Canister Filled with Media of Example 1

| Chemical Parameter | Emission Limit (ppm) | Percentage Measured |
|---|---|---|
| Carbon Monoxide (CO) | 0.25 | 0% |
| Nitrous Oxides (NOx) | 473 | 0% |
| Carbon Dioxide ($CO_2$) | N/A | 14% |

EXAMPLE 11

A filter containing the invented media 3/16" treated perlite was installed on the exhaust outlet on a two cycle back pack blower driven by a 40 cc internal combustion gasoline engine.

Emissions were measured using the testing apparatus of the previous example, within the enclosed room of example 9. The blower engine was allowed to cool down between runs.

Outlined below are the results with and without the filter on the exhaust from a gas-powered drill hammer located six feet from a CO detector
With Treated Filter on Gas Powered Drill

| Drill Hammer run Time (min) | Carbon Monoxide Concentration (ppm) |
|---|---|
| 1 | 0 |
| 2 | 0 |
| 3 | 0 |
| 40 | No Alarm |

Without Treated Filter on Drill

| Drill Exhaust Time (min) | Carbon Monoxide Concentration (ppm) |
|---|---|
| 1 | 90 |
| 2 | 295 |
| 3 | 454 |
| 4 | Alarm |

After the 4 minute run without the filter the room was filled with smoke and unbearable to stay to occupy. Whereas, with the filter attached, after 40 minutes, there was no visible smoke and no unpleasant effects felt.

EXAMPLE 12

Removal of Sulphides, Ammonia, Phenols, and Oil from a Liquid Effluent

The composition on media was tested for its ability to remove sulphides, ammonia, phenols and oil mist all in a single stage process, from a liquid effluent, without addition of any chemicals to the contaminated medium. To demonstrate this, a test was carried out on a liquid waste from an oil refinery.

Test Procedure:
A 65 liter sample of waste fluid was obtained from the inlet to the waste treatment plant, representing an oily/water inlet mixture (Test #1);
A 65 liter sample of waste fluid was obtained from the waste treatment plant part way through its treatment process (Test #2):
A 65 liter sample of waste liquid was obtained near the end of the treatment process (Test #3):
Each of these samples was pumped through a coarse 3/16" perlite media treated with the composition of this invention prepared as in example 1. No conditioning unit or filter was used in the this test; Samples of the effluent were tested before and after the effluent was passed through the filter for each of the above tests, with water samples being sent to an accredited testing laboratory for lab testing.

Results of these tests were as follows:

TEST #1: (Untreated Effluent):

| Parameter | Inlet Concentration (ppm) | Outlet Concentration (ppm) | Percent Reduction (%) |
|---|---|---|---|
| TPH | 17.0 | 4.3 | 75 |
| Ammonia | 5.4 | 1.9 | 65 |
| Phenols | 1.6 | 0.49 | 69 |
| Sulphides | 0.69 | 0.06 | 91 |

TEST #2: (Midpoint of Treatment Process):

| Parameter | Inlet Concentration (ppm) | Outlet Concentration (ppm) | Percent Reduction (%) |
|---|---|---|---|
| TPH | 17.0 | 7.3 | 57 |
| Ammonia | 8.0 | 3.3 | 59 |
| Phenols | 0.89 | 0.30 | 66 |
| Sulfides | 0.44 | Non-Detectable | 100 |

TEST #3: (End of Treatment Process)

| Parameter | Inlet Concentration (ppm) | Outlet Concentration (ppm) | Percent Reduction (%) |
|---|---|---|---|
| TPH | 0.2 | Non-Detectable | 100 |
| Ammonia | 0.47 | 0.30 | 36 |
| Phenols | 0.005 | 0.003 | 40 |
| Sulfides | Non-Detectable | Non-Detectable | — |

EXAMPLE 13

Removal of Heavy Metals and Other Metal Contaminants from Contaminated Water and Air The compositions of the invention are effective in removing heavy metals as well as other metal contaminants through the process of running an aqueous fluid and air through a substrate treated with the composition. The following test was carried out to demonstrate this effectiveness:

Test Procedure:
1. A contaminated groundwater well was selected for testing where the groundwater was known to contain elevated levels of heavy metals, as well as high concentrations of aluminum, iron and other metals;
2. A separator and pump system was installed near the well, and groundwater was pumped through it for treatment;
3. The separator consisted of a cylindrical tank filled with 5.7 cubic feet of coarse perlite material treated with a composition of the invention a hydrocarbon resin and a drying oil;
4. Water was continuously pumped through the separator for more than 10 volume changes before any testing was commenced. Water samples were then extracted at a point where the water entered the separator and another point where it left the separator for testing.

Results of these tests were as follows:

| Parameter | Inlet Concentration (ppb) | Outlet Concentration (ppb) | Percent Reduction (%) |
|---|---|---|---|
| Aluminum | 12 | Non-Detectable | 100 |
| Arsenic | 11 | 7.1 | 35.5 |
| Barium | 78 | 72 | 7.7 |
| Cobalt | 1.3 | 1.2 | 7.7 |
| Iron | 2400 | 68 | 97.2 |
| Lead | 52 | 17 | 67.3 |
| Uranium | 0.2 | Non-Detectable | 100 |
| Zinc | 17 | 13 | 23.5 |

The separator was effective in removing 100% of both aluminum and uranium. Iron was decreased by 97.2%.

The present invention has been described in terms of particular embodiments found or proposed by the present inventors to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

All publications, patents and patent applications are herein incorporated by reference in their entirety to the same extent as if each individual publication, patent or patent application was specifically and individually indicated to be incorporated by reference in its entirety.

I claim:

1. A method for removing a contaminant from a gas, comprising providing a filter medium comprising a substrate impregnated with at least one hydrocarbon resin and at least one drying oil, and contacting said gas with said filter medium.

2. The method of claim 1 wherein said filter medium is prepared by combining said hydrocarbon resin and drying oil with an organic solvent to form a solution, combining said substrate with said solution, and removing said organic solvent by evaporation.

3. The method of claim 1 wherein said substrate comprises perlite, steel wool or polyester fibres.

4. The method of claim 1 wherein said hydrocarbon residue comprises a low molecular weight hydrocarbon resin.

5. The method of claim 1 wherein said drying oil comprises tung oil, linseed oil, poppy oil, walnut oil, sunflower oil, cottonseed oil, corn oil, soybean oil, sardine oil, herring oil or safflower oil.

6. The method of claim 5 wherein said drying oil comprises tung oil.

7. The method of claim 1 wherein said gas comprises exhaust from an internal combustion engine or a burner.

8. The method of claim 1 wherein said contaminant comprises particulates, carbon monoxide, sulphur dioxide or nitrogen oxide.

9. A method for removing a contaminant from a liquid, comprising providing a filter medium comprising a substrate impregnated with at least one hydrocarbon resin and at least one drying oil, and contacting said liquid with said filter medium, wherein said contaminant comprises a sulphide compound, ammonia, a phenol compound or a heavy metal.

10. The method of claim 9 wherein said filter medium is prepared by combining said hydrocarbon resin and drying oil with an organic solvent to form a solution, combining said substrate with said solution, and removing said organic solvent by evaporation.

11. The method of claim 9 wherein said substrate comprises perlite, steel wool or polyester fibres.

12. The method of claim 9 wherein said hydrocarbon residue comprises a low molecular weight hydrocarbon resin.

13. The method of claim 9 wherein said drying oil comprises tung oil, linseed oil, poppy oil, walnut oil, sunflower oil, cottonseed oil, corn oil, soybean oil, sardine oil, herring oil or safflower oil.

14. A filter medium for removing a contaminant from a gas, comprising a substrate impregnated with a hydrocarbon resin and a drying oil.

15. The filter medium of claim 14, prepared by combining said hydrocarbon resin and drying oil with an organic solvent to form a solution, contacting said substrate with said solution, and removing said organic solvent by evaporation.

16. The filter medium of claim 14 wherein said substrate comprises perlite, steel wool or polyester fibres.

17. The filter medium of claim 14 wherein said hydrocarbon residue comprises a low molecular weight hydrocarbon resin.

18. The filter medium of claim 14 wherein said drying oil comprises tung oil, linseed oil, poppy oil, walnut oil, sunflower oil, cottonseed oil, corn oil, soybean oil, sardine oil, herring oil or safflower oil.

19. A method for removing a contaminant from a gas comprising providing a filter medium comprising a substrate impregnated with at least one hydrocarbon resin and at least one drying oil and contacting said gas with said filter medium, wherein said filter medium is contained within a cartridge and said cartridge is located in an exhaust stream of gas from a source.

* * * * *